(12) United States Patent
Waide

(10) Patent No.: US 9,228,651 B2
(45) Date of Patent: Jan. 5, 2016

(54) COMPACT TORQUE-TRANSMITTING GEARBOX WITH HIGH REDUCTION RATIO

(71) Applicant: Karem Aircraft, Inc., Lake Forest, CA (US)

(72) Inventor: William Martin Waide, Wrightwood, CA (US)

(*) Notice: Subject to any disclaimer, the term of this patent is extended or adjusted under 35 U.S.C. 154(b) by 0 days.

(21) Appl. No.: 14/198,475

(22) Filed: Mar. 5, 2014

(65) Prior Publication Data

US 2014/0256495 A1    Sep. 11, 2014

Related U.S. Application Data

(60) Provisional application No. 61/772,957, filed on Mar. 5, 2013.

(51) Int. Cl.
| | | |
|---|---|---|
| *F16H 33/00* | (2006.01) | |
| *F16H 35/00* | (2006.01) | |
| *F16H 37/00* | (2006.01) | |
| *F16H 49/00* | (2006.01) | |
| *F16H 55/08* | (2006.01) | |
| *F16H 25/06* | (2006.01) | |

(52) U.S. Cl.
CPC .......... *F16H 49/001* (2013.01); *F16H 55/0833* (2013.01); *F16H 2025/066* (2013.01)

(58) Field of Classification Search
CPC ... F16H 7/06; F16H 49/001; F16H 2049/006; F16H 55/0833
USPC .............................. 74/393, 640, 650; 475/167
See application file for complete search history.

(56) References Cited

U.S. PATENT DOCUMENTS

| 2,210,240 | A | * | 8/1940 | Herrick ........................ 475/167 |
| 2,966,808 | A | * | 1/1961 | Grudin ........................... 74/640 |
| 3,068,719 | A | * | 12/1962 | Singelmann .................... 74/640 |
| 3,190,149 | A | * | 6/1965 | Gorfin ........................... 475/167 |
| 3,307,434 | A | * | 3/1967 | Kope ............................. 475/167 |
| 3,710,635 | A | * | 1/1973 | Whitehorn ................... 475/167 |
| 3,726,158 | A | * | 4/1973 | Brown ......................... 475/167 |
| 3,861,242 | A | * | 1/1975 | Adams et al. ................. 475/167 |
| 4,023,440 | A | * | 5/1977 | Kennington et al. ......... 475/159 |
| 4,194,415 | A | * | 3/1980 | Kennington et al. ......... 475/167 |
| 4,227,422 | A | * | 10/1980 | Kawashima et al. ......... 474/156 |
| 4,307,630 | A | * | 12/1981 | Osborn et al. ............... 475/159 |
| 4,379,414 | A | * | 4/1983 | Dannatt ........................ 475/167 |
| 4,640,154 | A | * | 2/1987 | Osborn ........................ 475/178 |
| 4,713,985 | A | * | 12/1987 | Ando ........................... 475/168 |
| 4,969,376 | A | * | 11/1990 | Fickelscher .................... 74/640 |
| 2009/0205451 | A1 | * | 8/2009 | Bayer et al. .................... 74/325 |
| 2010/0024593 | A1 | * | 2/2010 | Schmidt et al. ................ 74/640 |
| 2012/0046140 | A1 | * | 2/2012 | Shelef et al. ................. 475/182 |
| 2012/0270692 | A1 | * | 10/2012 | Hoebel et al. ............... 475/149 |

* cited by examiner

*Primary Examiner* — William Kelleher
*Assistant Examiner* — Jake Cook
(74) *Attorney, Agent, or Firm* — Fish & Tsang, LLP

(57) ABSTRACT

A harmonic drive has an outer gear, an elliptical follower hub, and an outer chain coupled to the follower hub, and having teeth that mate with the outer gear. Preferred embodiments further include an inner chain disposed such that the follower hub is functionally interposed between the inner and outer chains.

5 Claims, 2 Drawing Sheets

$F = 1 - \dfrac{C}{B}$

COMPACT TORQUE-TRANSMITTING GEARBOX WITH HIGH REDUCTION RATIO

This application claims priority to U.S. provisional patent application Ser. No. 61/772,957 filed Mar. 5, 2013, the disclosure of which is incorporated herein in its entirety.

Field of the Invention

The field of the invention is gearboxes.

BACKGROUND OF THE INVENTION

The following description includes information that may be useful in understanding the present invention. It is not an admission that any of the information provided herein is prior art or relevant to the presently claimed invention, or that any publication specifically or implicitly referenced is prior art.

Many machines require a numerically high reduction ratio gearbox, capable of transmitting substantial power within a limited overall volume. Various long-established methods for all-mechanical drives include a worm-and-wheel gearset, and planetary gearboxes which can be compounded to yield high reduction ratios. One result of adopting these traditional approaches is that the completed reduction gearbox is heavy, or large, when compared to the torque transmitted to the output of such gearboxes. The measures of interest (in lb.-feet units) are therefore pounds-feet of torque per pound weight of the device, or, lb.-ft. per cubic ft. of overall volume.

Awareness of these specific limitations, especially when gearboxes are needed with a reduction ratio ranging from 50:1 to many hundreds to one, prompted a prior design and manufacturing effort into the art of producing incrementing planetary drives. These mechanisms are known as Strain Wave Gearing drives, or, Harmonic Drives.

There are several limitations of the current art with respect to Harmonic Drives. Prior art embodiments of Harmonic Drives, when taken to the largest practical size in terms of torque output and hence physical scale, can be shown to have an upper output torque limit approaching 3,000 lb.-ft. However, some applications require a multiple of 10 times, or even 20 times, or more, of this torque output. It is highly desirable that this is achieved in a single-stage device which avoids the complications of coupling several gearsets together to achieve the required ratio. The detailed description of the cause of the present upper torque limitation is provided here. Clearly, there is a need to further investigate the art of incrementing planetary drives, with an intent of transmitting substantially higher output torques than are currently achieved, and at the same time, improve the specific torque/weight ratio and the torque/volume ratio. This would be a critical design requirement for an aircraft application, for example.

Therefore, there is still a need for improved harmonic drives.

SUMMARY OF THE INVENTION

The inventive subject matter provides apparatus, systems and methods in which a harmonic drive has an outer gear, an elliptical follower hub, and an outer chain coupled to the follower hub, and having teeth that mate with the outer gear. Preferred embodiments further include an inner chain disposed such that the follower hub is functionally interposed between the inner and outer chains.

DETAILED DESCRIPTION

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should further be appreciated that all methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Moreover, groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims. The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
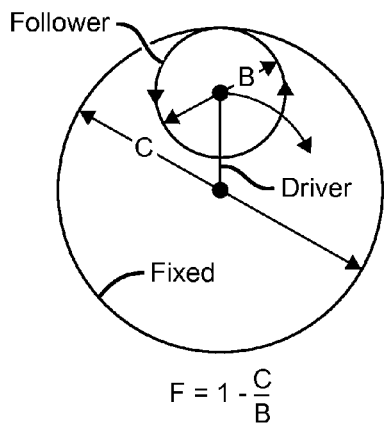
FIG. 1 is a schematic of a prior art planetary gear.
Figure 2:
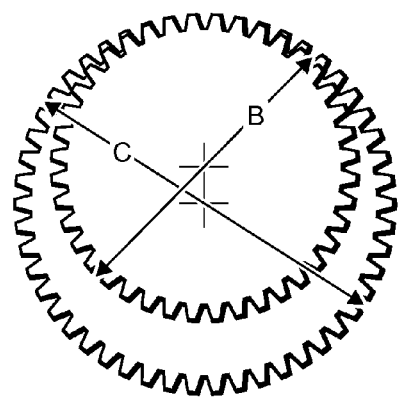
FIG. 2 is a schematic of another prior art planetary gear.

Planetary gearsets in their simplest form consist of three elements, namely, a driver, otherwise known as a planet carrier, a follower, otherwise known as a planet gear with external teeth, and a ring gear with internal teeth. FIG. 1 shows this arrangement. C represents the number of teeth in the Ring, B the number of teeth in the Planet. The ratio between Carrier (the Input) and the Follower (the Output) is 1-C/B. If tooth count B is only marginally smaller than tooth count C, as is shown in FIG. 2, and arbitrarily putting in numerical values of 100 for C and 98 for B, the resulting ratio is (almost exactly)—50:1. The negative sign indicates a direction reversal. A practical problem resulting from two gears, closely matching in tooth number, being meshed together, is that of tooth interference. A working solution has a limited contact ratio and hence a severe limitation on the amount of tangential force that can be carried across the mating teeth.

Figure 3:
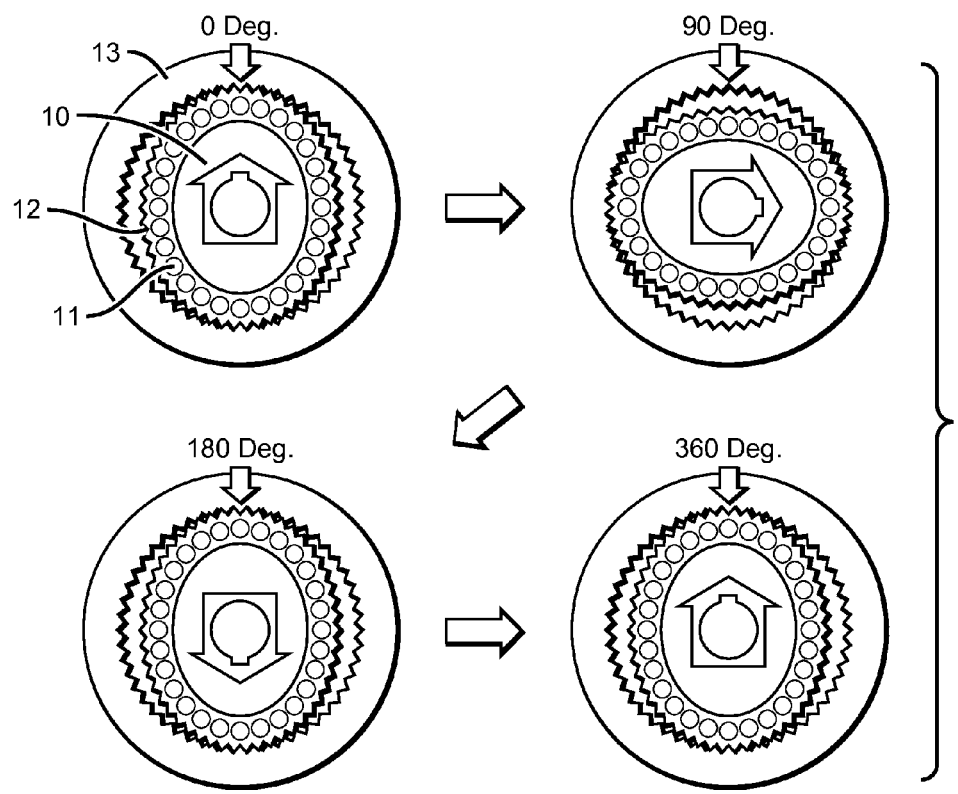
FIG. 3 is a schematic of a prior art device having a non-circular follower gear.

Prior art reveals an innovative solution to this issue, by causing the follower gear to be non-circular, as illustrated in FIG. 3. This output gear is strained into an elliptical shape.

Thus this gear can have a few teeth less (a minimum of 2 teeth less) than the Ring, and be in tooth mesh in two, diametrically-opposite zones with a generous contact ratio. The zones between the meshing areas are non-contacting. When the wave generator is rotated once, it will be seen that the largest deflected local diameter of the follower subscribes one revolution for each input revolution. The result, considering the external rim of the follower gear to be a co-joined pair of continuous beams, is that each beam is deflected twice per input revolution under the action of radial forces that closely match a uniform loading pattern. These radial forces are transmitted by means of a bearing to the beam from an elliptical wave generator, which is the torque input to the device.

It will be readily apparent that when a beam is deflected under the action of a distributed load, and the beam is enlarged in scale without changing the proportionality of the length and cross section, the distributed load required to produce a scale deflection varies as the square of the scaling factor. Therefore a Strain Wave Geared device, enlarged by a factor of 4 from the existing largest device with practical material sections, would require a distributed deflecting force to deform the gear into the elliptical shape of 16 times the original. Such extreme bearing forces require a substantial weight of back-up material to achieve the required stiffnesses, which is the underlying reason for Strain Wave Gearing to become disproportionately heavier with increasing size.

The inventive step described below addresses a method of isolating the forces required for gear deformation to an elliptical shape from the localized forces resulting from the multiple contacts of the gear teeth themselves and from the shear forces generated in the output sleeve of the follower. FIG. 3 shows an overall view of the components of a conventional complete Strain Wave Gearset, Item 10 being the Wave Generator, or input member, Item 11 is the bearing arrangement between the generator and the follower, Item 12 is a follower hub, and Item 13 is the Fixed Outer Ring Gear.

Figure 4:
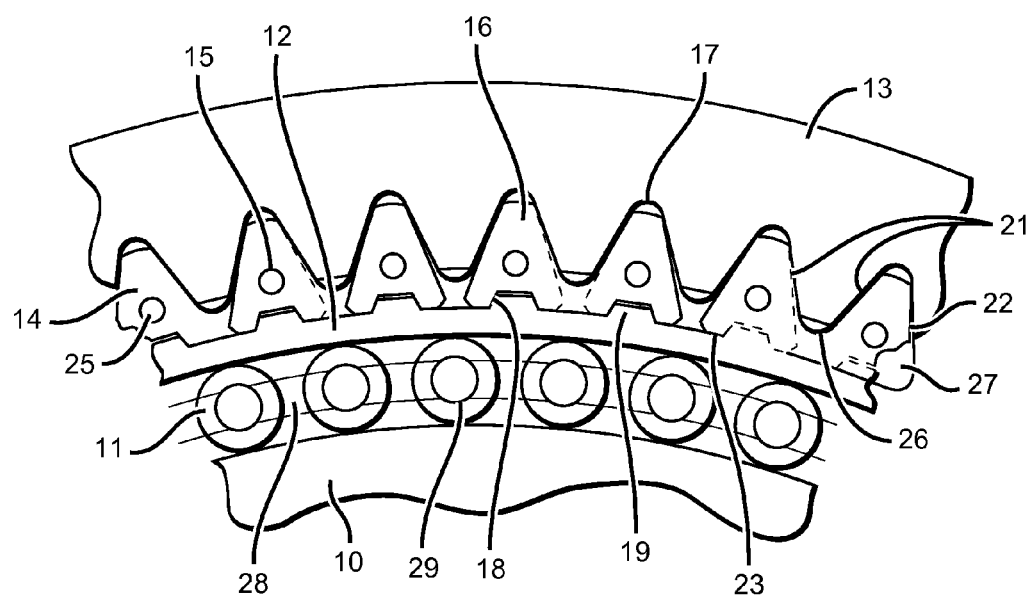
FIG. 4 is a schematic of a portion of an inventive Harmonic Drive.

The inventive modification to the follower is shown in FIG. 4 in conjunction with the surrounding parts. A multi-link chain 14 consisting of pin-jointed links 15 is superimposed on the elliptical follower hub 12 which is strained into this curvature by the action of the wave generator 10. The gear teeth 16 of this chain are external, meshing with the internal teeth 17 of the fixed circular ring gear 13. Internal to the links of the chain are recessed key slots 18 which transfer torque, by means of multiple shear paths, to projecting splines 19 the external rim of the follower hub 12.

A further description of the components detailed in FIG. 4 is as follows. Item 13 is the Outer Ring Gear. The gear teeth 16 are on the external circumference of the chain, and the torque-transferring recesses 18 are on the internal circumference. All links 15 are identical. Only the inner two working surfaces 21 defined by the surface between the two teeth on any one link carries a profile that is involute in form. The link flank outer facing surfaces 22 are provided with clearance from the mating ring gear. The link zone Item 23 is in contact with the minor diameter 24 of the splined external surface of the follower 12.

All chain links are stacked sequentially across the face width and sequentially in the circumferential direction, all being connected by transverse pins 25. Lateral guidance of the gear chain is provided by a series of non-recessed two-tooth links 26 operating in a circumferential groove 27 in the follower hub 12. Item 10 is the Wave Generator and Items 11 are the roller bearings, guided and separated by Cage 28. When used in large scale, the bearing rollers 11 are advantageously provided with a bore 29 to reduce weight.

Note that FIG. 4 also illustrates that the pitch diameter of the torque-transferring recesses and the pitch diameter of the link connecting pins are in close proximity. It will be understood by reviewing the change in the instantaneous radius of curvature of the deformable follower hub that the chordal distance between the flanks of the drive recess will vary minutely between the beam radius that occurs at the apex of the ellipse versus the radius at the flank of the ellipse. This dimensional difference relative to the in-elastic link can be accommodated by a small operating clearance. It is anticipated that the advantage of backlash-free operation will still be maintained by means of this innovative step because the chordal distance of the drive lug on the follower or output is at its largest only when the chain teeth are in contact with the ring gear in the zones where contact pressure is occurring.

It will be readily apparent from a study of the mechanical proportions of the follower hub, in particular its radial hoop thickness, and the depth of the articulated toothed gear chain that the hub can be deformed into an elliptical shape with relatively low disturbing forces because the chain is free to articulate and follow the elliptical form. Further, it should be understood that, unlike a power transmission chain where each and every connecting link with its associated pins is directly load bearing, this toothed gear chain transfers load mostly directly from the external tooth profile to the internal drive lug profile, and only indirectly across the connecting pin interface. The gear chain therefore has inherent multiple redundancy and will continue to function even with a proportion of the pin complement having failed.

The steel material for the laminated chain undergoes multiple cold-working operations when in sheet stock form, and therefore has high resistance to fatigue in either tooth bending or tooth contact pressure. This is in contrast to the singular material used for both the teeth and the hoop (the Flexspline component being fabricated from one piece of steel) evident in the execution of the prior art. Being articulated, in this invention, the gear chain elements are immune from stresses induced by continuous deflection, whereas, in the prior art, the entire gear constructed from a single steel element is in flexure Additionally, it should be noted that various bearing arrangements are possible between the wave generator and the follower hub. FIG. 4 shows the use of hollow roller bearings, which offer weight saving for large machines. Alternatives are ball bearings and oil-pressure fed plain bearings for slow-speed applications.

It is anticipated that the entire device would be contained in an oil-tight enclosure, with the oil functioning as a lubricant and heat-transfer medium to the outside surroundings.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A harmonic drive comprising:
   a fixed circular outer ring gear having inwardly facing ring gear teeth;
   an elliptical follower hub having projecting splines; and
   an outer chain having (a) inner surface indentations disposed to mesh with the
   projecting splines, and (b) outer surfaces projections disposed to mesh with ring gear teeth.

2. The harmonic drive of claim 1, further comprising an inner chain of bearings disposed such that the follower hub is physically interposed between the inner and outer chains along a path of torque transfer.

3. The harmonic drive of claim 2, wherein the inner chain has roller bearings separated by cage, collectively configured to strain the follower hub to an elliptical shape.

4. The harmonic drive of claim 1, wherein the outer chain has gear teeth on an external circumference and torque-transferring recesses on an internal circumference.

5. The harmonic drive of claim 1, wherein the outer chain includes chain gear teeth that comprise the inner surface indentations and the outer surface projections.

* * * * *